Sept. 8, 1959  L. M. CARPENTER  2,902,797
WIRE STRIPPING APPARATUS
Filed Feb. 17, 1955  3 Sheets-Sheet 1

INVENTOR.
Louis M. Carpenter
BY
ATTORNEY

Sept. 8, 1959          L. M. CARPENTER          2,902,797

WIRE STRIPPING APPARATUS

Filed Feb. 17, 1955          3 Sheets-Sheet 2

INVENTOR.
Louis M. Carpenter
BY
ATTORNEY

Sept. 8, 1959  L. M. CARPENTER  2,902,797
WIRE STRIPPING APPARATUS
Filed Feb. 17, 1955  3 Sheets-Sheet 3

INVENTOR.
LOUIS M. CARPENTER
BY
ATTORNEY

# United States Patent Office 2,902,797
Patented Sept. 8, 1959

2,902,797
WIRE STRIPPING APPARATUS

Louis M. Carpenter, Fayetteville, N.Y.

Application February 17, 1955, Serial No. 488,785

17 Claims. (Cl. 51—80)

This invention relates to wire stripping apparatus such as is employed for removing coatings and coverings on insulated wire, and is more particularly directed to a stripper employing opposed conical fiber glass abrasive surfaces which substantially abut along the common element of the opposing surfaces.

Wire strippers have been proposed having a rotary annular end face composed of the ends of fiber glass filaments arranged parallel to the axis against which ends of insulated wire is held by a platen for a brief period while the wire is rolled in contact with the fiber glass surface to remove the enamel or other coating therefrom. Such a construction is shown in Patent No. 2,513,262. Also, there has been proposed for the purpose cylindrical rolls contacting tangentially, formed from a multiplicity of discs of woven fiber glass material, between which rolls the end of the wire is tangentially projected for stripping. The end face type referred to employs but a single cutting surface, so that it is necessary on heavier wire to make sure that the wire is rolled through a complete turn to assure removal of the insulation. Such face wheel is of relatively large diameter, which renders it difficult to remove the insulation from the end of the wire without additional free working length of the wire, greatly in excess of the portion from which the insulation is to be stripped. In the cylindrical roll type, the rolls may be of relatively small diameter so that excess length can be reduced in relation to the reduction of diameter. However, the practical limit is about 5/8" diameter for new wheels which become inoperative when the diameters, in use, wear down to 1/2" at which point the bearing housings meet and permit no further stripping action between the wheels. The remaining portion of the wheel, which is actually considerably more than the portion used in stripping, must be thrown away.

In the face type of stripper, there is a tendency for the wire undergoing stripping to be brushed into an arc concentric with the axis of the wheel, whereupon the ends of the cutting filaments in contacting the wire are parted, travel along the wire and tend to score the wire lengthwise, and after clearing the end of the wire, restore themselves to axial position. In the cylindrical type made up of discs of fiber glass cloth, the filament ends extend radially or at least lie in transverse planes, and as a wire to be stripped is inserted tangentially between a pair of such rolls, the fiber ends are again parted, pass along the side of the wire, and after leaving the wire return to their radial or transverse planar relationship. Both arrangements have a tendency to abrade or score the wire lengthwise, or produce what may be referred to as a spline effect upon the wire, and such effect is most noticeable at the point where stripping commences, and this weakens the wire, at its most vulnerable point.

The present invention is directed to employing conical fiber glass abrading wheels, whose axes may vary from an angle of 10° to an angle as great as 170°. In such abrading wheels, the fiber glass fibers may be arranged so as to extend substantially parallel or helical with respect to the axis of rotation, or substantially radial, or lying in a plane transverse to the axis.

Such rolls may be formed of a spiral wrap or wraps of fiber glass fabric, bias cut or otherwise, in which case the fibers extend substantially parallel or helical, or the rolls may be formed of fiber glass discs, in which case the fibers extend substantially radial, or in any event tend to lie in transverse planes. Where the shafts of the conical wheels are at an angle of about 90°, the wheels can be of the spiral roll type or parallel fiber type, or of the disc type. As the angle between the shafts increases above 90° the parallel fiber or spiral type becomes increasingly preferable, and as the angle decreases below 90°, the disc type become increasingly desirable.

The conical faces meet substantially on a common element of both conical faces, and wire to be stripped is fed between the rolls substantially along a plane tangential to both rolls at the common element, and such plane lies on the bisector of the angle between said shafts. When an end of a wire, or an intermediate section is fed between the conical faces, the end fibers appear to part upon contact with the wire, but the curvature of the path of the end fibers is such as to cause the fibers to flex and cross over the wire, on the approach side, and further cross back over the wire as the fiber ends leave the wire. At no point do such fiber ends travel parallel, or on an arc concentric with the length or arc of wire being stripped as has been referred to in connection with previous apparatus and methods. While reference has been made to fiber glass as the abrading medium, the abrading filaments may be of other material or abrasive and binder impregnated cloth, the cloth providing a yieldable support for the abrasive to travel the path referred to above, and resulting from the conical surfaces featuring the invention. In fact sheet material such as rubber containing abrasive grain or finely ground glass or glass rovings may be employed and exhibits the effect referred to.

The invention is therefore directed to apparatus for driving conical stripping surfaces to produce the result described, as well as to provide features in connection therewith for rendering the apparatus capable of handling different forms of insulation, such as enamel or plastic films, or cotton, silk or artificially produced servings or combinations of the foregoing, as well as different sizes and forms of wire.

The above and other novel features of the invention will appear more fully hereinafter from the following detailed description, when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
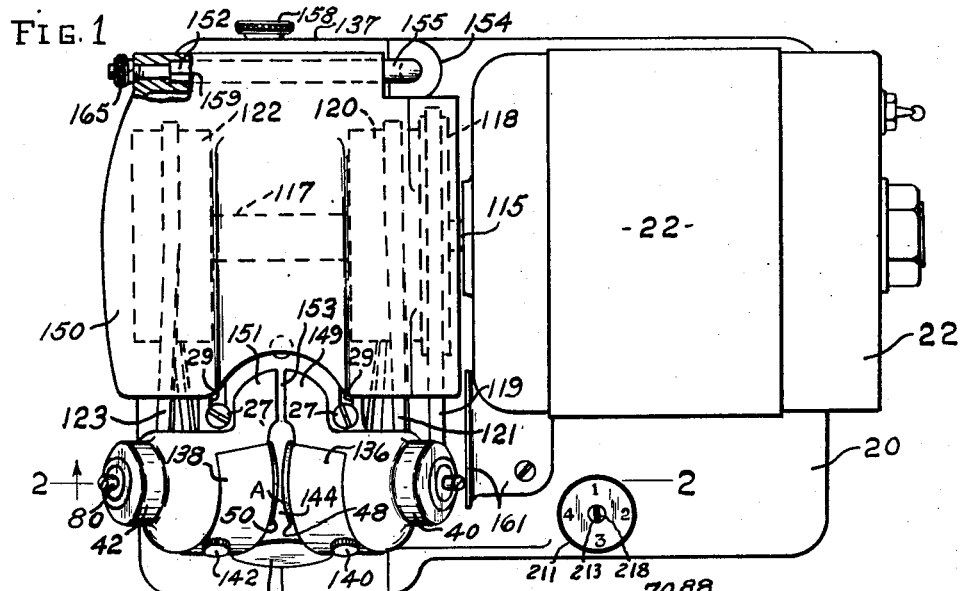
Figure 1 is a plan view of the wire stripper.
Figure 2:
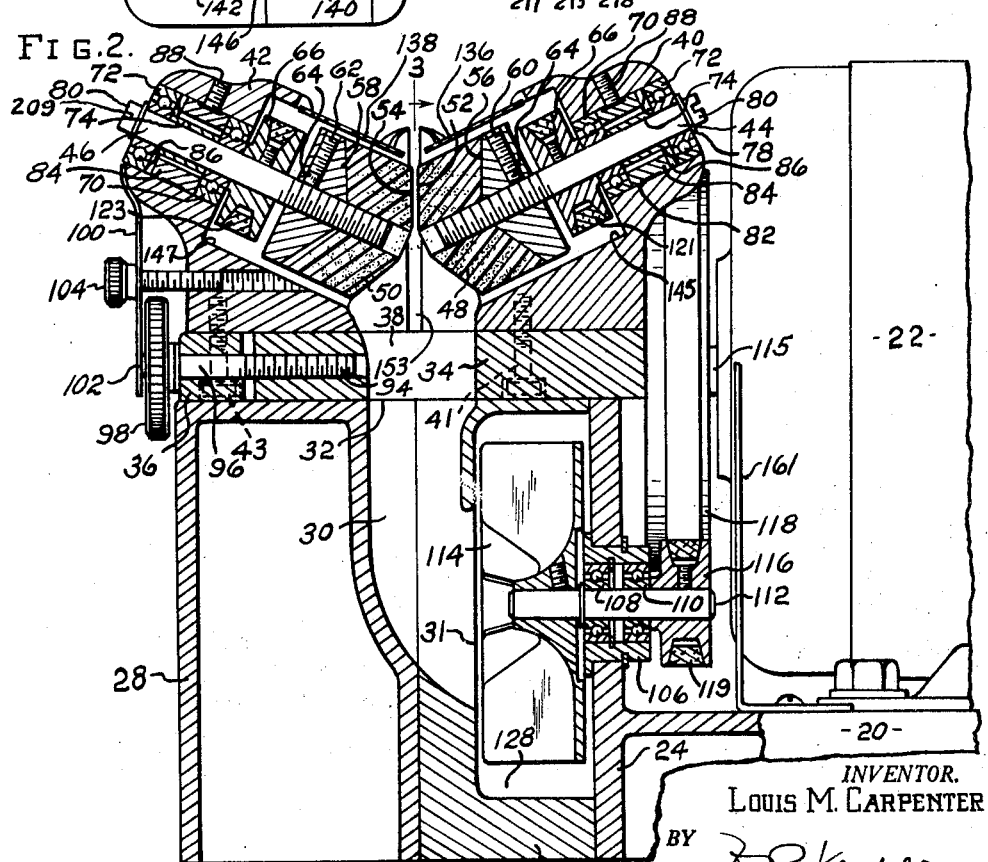
Figure 2 is a sectional view taken substantially on the line 2—2 of Figure 1.
Figure 3:
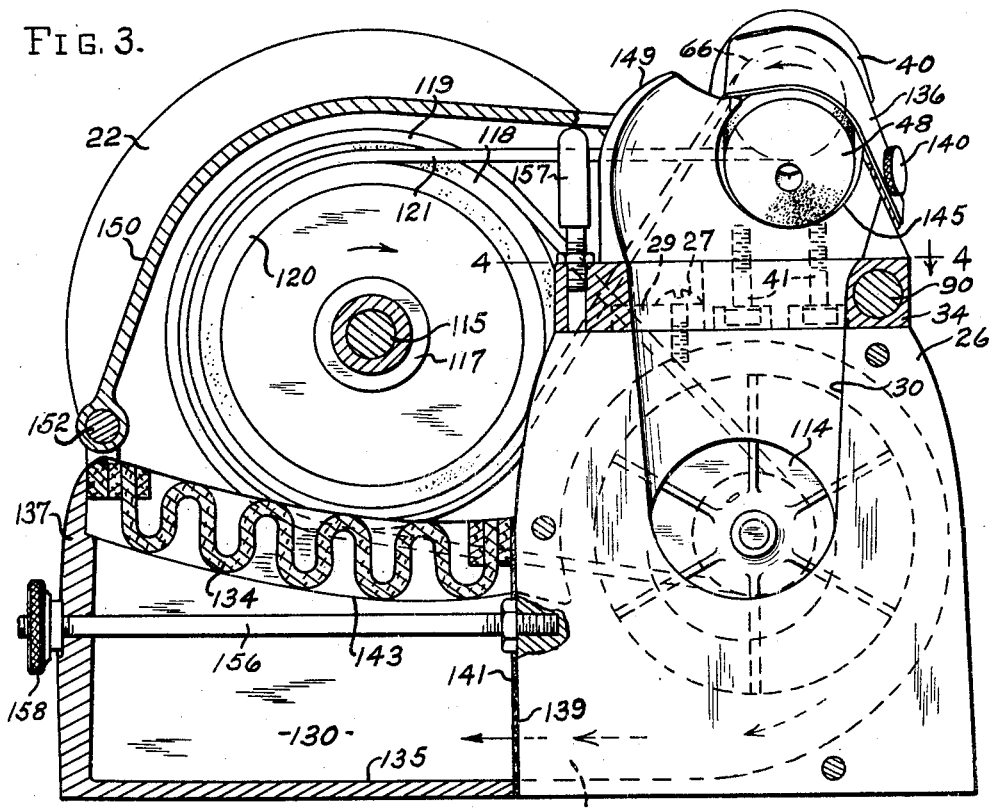
Figure 3 is a transverse sectional view taken substantially on the line 3—3 of Figure 2.
Figure 4:
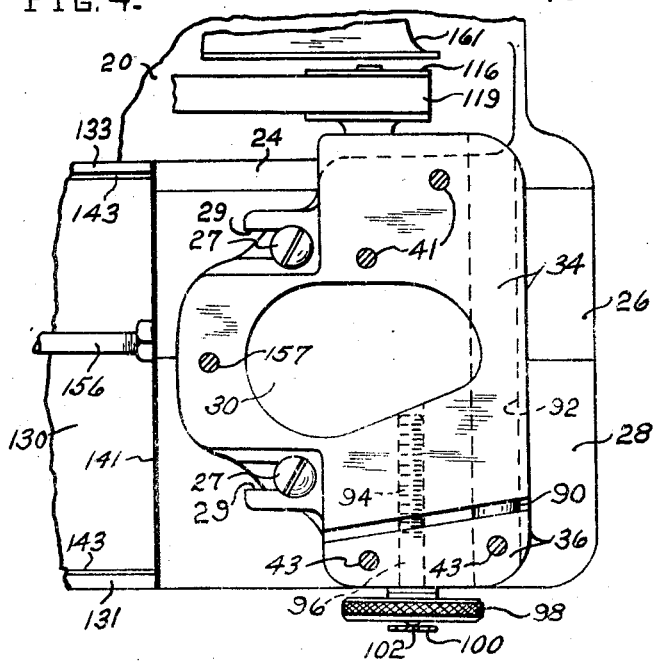
Figure 4 is a horizontal sectional fragmentary view taken substantially on the line 4—4 of Figure 3 showing the bearing plate mounts for the fiber glass wheels and the refuse container with the filter removed.

In Figures 1 and 2 there is shown a base 20 on which is mounted a motor 22, the base having an integral end plate 24 at the motor shaft end, the motor being mounted to the rear of the base and the end plate being generally disposed over the forward half thereof. Against the end plate 24 is a centrifugal fan housing member 26 and a further member 28 forming with the member 26 and inlet duct 30 leading to the fan. The plate 24 and members 26 and 28 provide a level support surface as at 32 across their upper faces, and there is secured to the plate and the members 26 and 28 a bearing support plate 34, one end of which is provided with an adjustable section 36, which may be extended to vary the length of the bearing support thus provided. The plate is provided with an opening 38 leading downwardly to the centrifugal blower to the port 30 and inlet at 31. The plate is secured to the members by screws 27 extending through open slots 29, so that the plate can be adjusted forwardly or rearwardly to vary the belt tension as will appear hereinafter.

The plate 34 and the section 36 have mounted thereon by threaded fastenings 41 and 43, bearing supports 40 and 42, in which are journalled shafts 44 and 46 which are inclined with respect to each other. The adjacent ends of the shafts 44 and 46 are provided with fiber glass wheels 48 and 50 having frusto-conical end faces 52 and 54 substantially meeting on a vertical tangential line of contact forming a common element of the two surfaces 52 and 54. The fiber glass wheels are made up of fine filaments of fiber glass extending parallel to the axis of rotation, such filaments being bonded together and being secured to metal hubs 56 and 58, each of which are screw-threaded upon the shafts 44 and 46 and secured in any particular position to the shafts by Allen type socket head set screws 60 and 62, which set screws bear upon a soft brass slug such as 64 in engagement with the threads of the respective shafts 44 and 46.

Each of the shafts are provided with a V-belt pulley 66 and are journaled in the bearing supports in spaced ball bearings 70 and 72, the inner races of which are spaced by a sleeve 74 and held in place by the pulley 66 and a thrust washer 78, the latter being held in position by an end groove 80. The outer races of the bearings 70 and 72 lie within the bore 82 of the bearing block 40 and are spaced by a sleeve 84 abutting the outer race of the inner bearing 70, and bearing against the outer race of the outer bearing 72 through a spring dished washer 86, the outer edge of which contacts the outer bearing race. The sleeve 84 is rigidly secured in place by a set screw 88, and it will be seen that the outer race of the bearing 70 is accurately positioned by the sleeve 84 and that the spring washer tends to lightly spread the outer races while the inner races are held in fixed spaced relation, whereby to eliminate radial slack within the bearings themselves, so that the shafts will always rotate on a true center.

By reason of the threads upon the shafts 44 and 46, the conical faces 52 and 54 may be adjusted for wear and caused to be positioned upon the shafts symmetrical with respect to one another and the plane passing through the intersection of the axes of the shafts.

The section 36 upon which the bearing support 42 is mounted, is slidably disposed upon the upper surface 32 of the member 28, the section 36 having a slide bar 90 rigidly secured thereto by the forward screw 43, which slide bar projects into a horizontal bore 92 in the plate 34. The section 36 may be moved to extend the spacing between the bearings by a thumb screw, the shank 94 of which is threaded in the plate 34. The end of the threaded shank 96 is provided with a knurled wheel 98, and endwise movement of the screw 94 with respect to the section 36 is prevented by a rigid strap 100 having its upper end bearing on the bearing support 42 and the lower end bearing on the outer hub center of the knurled wheel as at 102, pressure being supplied to the strap 100 intermediate its ends by a thumb screw 104. By increasing the pressure upon the strap 100 through tightening of the screw 104 threaded in the bearing support 42, the knurled wheel 98 may be frictionally and effectively held against rotation in any adjusted position. At the same time, by loosening the pressure of the strap 100 on the knurled wheel, the section 36 and the bearing support 42 may be readily moved away from or toward the bearing support 40 to provide the spacing desired between the conical faces 52 and 54, which spacing is varied in accordance with the diameter of the wire from which the insulation is to be stripped. The strap acts as a thrust member during the bearing extending movement.

In the end plate 24, there is provided a bearing assembly flanged sleeve 106 having spaced ball bearings 108 and 110 therewithin supporting the shaft 112, on one end of which is positioned the impeller 114 of a centrifugal fan and on the other end of which is positioned a V-belt pulley 116. The motor shaft end 115 is provided with a sleeve 117 having three drum pulleys 118, 120 and 122. The drum pulley 118 is provided with a belt 119 extending to the pulley 116 to drive the fan impeller 114. The pulleys 120 and 122 are of like diameter, and are provided with belts 121 and 123 which are crossed to provide reversed rotation, and which extend to the respective V-belt pulleys 66 on the shafts 44 and 46.

The fan 114 discharges into a rearwardly directed tangential discharge duct 128 in section 26 into a drawer-like compartment 130, having side walls 131, 133, a bottom wall 135, and an outer end wall 137. The inner end is open and abuts the wall 139 to receive the pump discharge, there being provided a felt seal 141. The upper portion of the drawer 130 is provided with a corrugated filtering medium 134, resting on shoulders 143 in the side walls 131 and 133. The corrugated filter is compressed fore and aft between the wall 139 and the drawer wall 137, and caused to buckle slightly downwardly against the shoulders 143. Thus air leaving the compartment formed by the drum-like box 130 will be separated from the insulating scrappings delivered to the compartment by the fan impeller 114. The drawer compartment 130 is held in position by the tie bolt 156 anchored in the section 26, the bolt having a removable thumb screw 158 at its back end to hold the drawer in place, or permit its removal to empty the refuse gathered therein.

Each of the fiber glass wheels are partially housed in recesses such as 145 and 147 in the bearing blocks 40 and 42 and are further enclosed by removable shrouds 136 and 138 held in position by thumb screws 140 and 142. Such shrouds provide a narrow opening as at 144 for inserting the end or the mid section of a wire, the insulation of which is to be stripped. The forward space between the bearing supports 40 and 42 may be covered by a thin disc such as 146, the edges of which are clamped between the shrouds 136 and 138 and the forward walls of the bearings supports 40 and 42. Each of the bearing supports 40 and 42 have rearwardly extending flares such as 149 and 151, which define a narrow slot 153 through which a wire end may extend. A cover 150, which is curved to house the drum pulleys and the belts extending therefrom is pivotally mounted on a horizontal portion 152 of a rod 155, one end of which is bent at right angles and extends downwardly into a post 154 integral with the rear corner of the base 20. The rod is rigidly secured in the post. The end of the rod is provided with a shoulder 159, to locate the cover axially thereof, and a thumb screw 165, so the cover can be removed. A rubber covered bumper post 157 is provided to position the cover when closed. A belt guard plate 161, mounted on the base 20 protects the belt 119.

It will be seen from a consideration of the foregoing that the bearing supports 40 and 42 will be adjusted by the knurled wheel 98 so as to provide a proper spacing between the conical faces 52 and 54 depending on the wire thickness which is to be stripped. In practice, the faces will actually contact one another, in the event fine wire as fine as 50 AWG is being treated. For larger wire regardless of size, such spacing will be provided so that the action of the fiber glass ends in removing insulation will be such as to yieldingly abrade such insulation, without unnecessarily crushing the glass fiber ends. The action of the opposed conical faces when a wire is placed in contact at about the point A (see Figure 1), just forward of the vertical center line, is to gently draw the wire between the conical faces, whereupon the fiber glass ends remove the insulation and roll the wire so as to remove the insulation completely. From the view in Figure 1, it can be seen that the disc 146 may be raised or lowered to provide a guide for the wire to be stripped. While the conical faces are shown slightly spaced as would be the case for coarse wire, when thin wire is used, the conical faces actually contact. The inter contact between the wheels assists in clearing the faces of strippings. Since the angle shown between the shafts is about 130°, the stripper wheels are composed of fibers extending parallel to the axis, or are made up of spirally laid strips of fiber glass, cloth or other effective medium for supporting in a yielding manner an abrasive on the conical faces.

Figure 5:
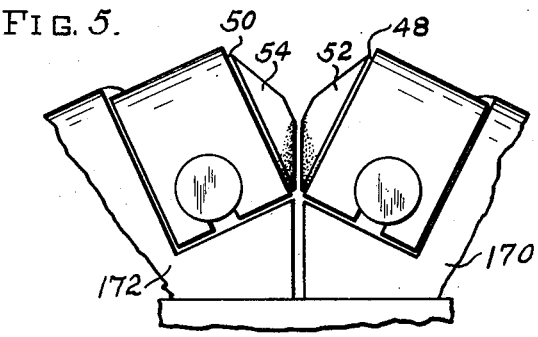
Figure 5 is a fragmentary side elevational view of a modified form with the fiber glass wheels arranged on upwardly converging axes.

In Figure 5, there is shown a pair of fiber glass wheels with their axes upwardly inclined, which arrangement is essentially the same as that shown in Figures 1–4, except that the rotation direction of the fiber glass wheels is reversed. Wire to be stripped is inserted between the wheels below the converging axis centers. As shown, the wheels 48 and 50 are mounted for rotation in bearing blocks 170 and 172 which may be moved toward or away from each other to adjust the spacing between the conical faces 52 and 54 to accommodate differing sizes of wire.

Figure 6:
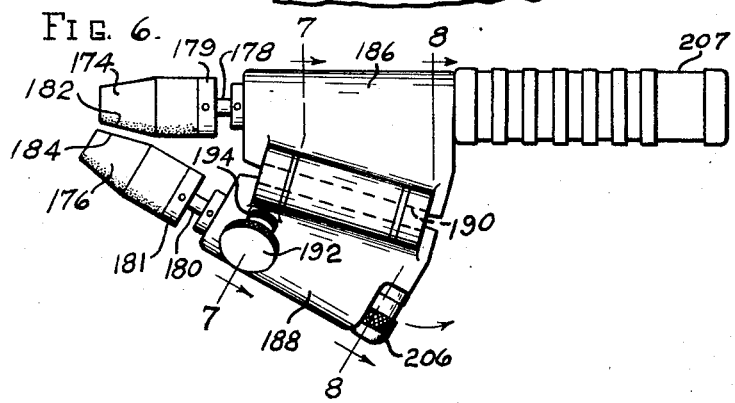
Figure 6 is a modified form of the invention showing a portable version wherein the angle between the shafts is about 10°.
Figure 7:
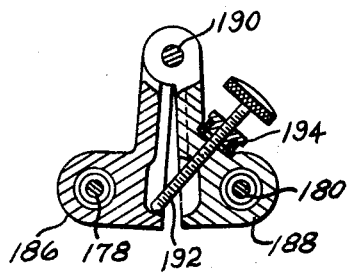
Figure 7 is a broken section taken substantially on the line 7—7 of Figure 6.
Figure 8:
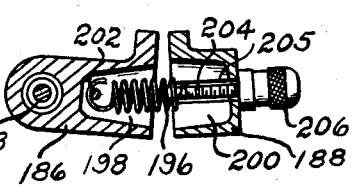
Figure 8 is a broken section taken substantially on the line 8—8 of Figure 6.
Figure 9:
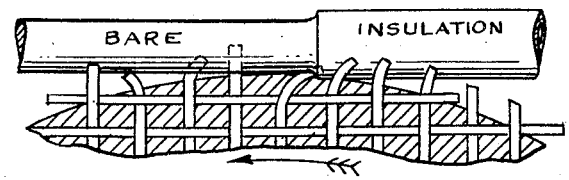
Figure 9 is a greatly enlarged fragmentary illustration of a portion of a wheel contacting a section of insulated wire.

In Figures 6–8 inclusive, there is shown a portable stripper employing wheels 174 and 176 mounted on shafts 178 and 180 which are inclined with respect to one another. Each of the wheels 174 and 176 are composed of a series of annular discs of fiber glass cloth which are threaded on the shafts 178 and 180, tightly compacted, and suitably bonded together with a binder to the collars 179 and 181. The conical abrading surfaces 182 and 184, since the angle is 10°, or less than 90° are composed of discs of fiber glass cloth. The taper permits an operator to strip insulation from pigtails without requiring excessive free lengths of wire, beyond the region where stripping is effected. The arrangement is particularly applicable to extremely fine wire, wherein in operation the wheels will lightly contact one another, and yield sufficiently to allow the wire to pass therebetween. The light frictional contact between wheels will drive one wheel from the other. A separate power drive for each roll can be applied if desired.

Each of the shafts 178 and 180 are journalled in hinged bearing blocks 186 and 188, in which are spaced ball bearings employed in a construction similar to that shown and described in Figure 2, there being provided yielding means for spreading the outer races of the spaced bearings to eliminate radial slack in each bearing. The blocks are hinged on a pin 190, and an inclined adjustment screw 192, with a lock thumb nut 194, is threaded in one block and adapted to bear on the other. A tension spring 196 nested in opposed cavities 198 and 200, is hooked on a pin 202 in block 186, and secured to a threaded stem 204 extending through a slot 205 in the block 188 to a thumb nut 206.

The spring is flexible so as to permit the stem to swing out of the slot whereupon the two blocks may be swung apart. A flexible drive shaft is connected to shaft 178, in a manner well understood in the art, such flexible drive shaft and flexible housing therefor, entering into the sleeve 207.

The wheels 48 and 50 may be made of an annular bundle or segmental bundles of fiber glass, the fibers of which extend axially, or the wheels may be formed of spiral wraps of fiber glass cloth. Such wraps may be composed of layers of different coarseness, that is fine or coarse weave, and the wrap-up strips may be cut from such cloth on a 45° bias. Two or more strips of varying fineness may be spirally wrapped together and intermixed.

To compensate for wear on the conical stripping faces, the wheels are threaded on their respective shafts. Should the surface 54 of wheel 50 approach the end of shaft 46, the shroud 138 is removed, set screw 62 loosened, and the wheel held while the shaft is turned, to advance the wheel along the shaft. The outer end of the shaft is slotted as at 209 to receive a screw driver, or a hand wheel such as 211 having a bore 213, with a cross pin 218 to engage the slot 209. The bore is provided with an upstanding slotted stud to store the hand wheel 211 in readiness for removal and use, and such wheel is provided with index numbers to assist in making a specific adjustment, which adjustment can be repeated in respect to the fiber glass wheel 48 on the other shaft 44. In practice, the threads on the shafts 44 and 46 will be right and left respectively, so that the fiber glass portion of the wheels will tend to thread toward the collars 56 and 58, so as not to strain the bond between such collars and the fiber glass portions.

While in the form illustrated in Figures 1–4, the angle of the shafts with respect to a horizontal plane is shown as 25°, and the angle between the shafts is 130°, the angle may be increased to 170°, or reduced to the middle of the range such as 90°. The apex angle of the cone surface will be the same as the angle between the shafts.

In the form shown in Figures 6–8 inclusive, the angle between the shafts is about 10°, and the apex angle of the cone abrasive surfaces is likewise 10°. Such angle may be increased into the middle of the range such as 90°, while utilizing woven disc material, whereas when the angle of 90° is exceeded, it becomes more practical to utilize spirally wrapped material, or axially extending filamentary material such as has been referred to in the embodiment shown in Figures 1–4. So long as the engaging surfaces are conical, the greatly enhanced stripping effect, substantially free of the scoring or splining effect upon the conductor is found to result.

The conical surfaces are found to have a great tendency to self-clean themselves of enamel and glass crushings, and the increased end flexing resulting from the curved path imposed by the contact of the wire with the conical surface is believed to be responsible. Further, the conical surfaces constantly tend to maintain themselves as true surfaces, and wear upon the abrasive faces, merely causes the conical surfaces to gradually recede axially.

The speed of rotation of the shafts 44 and 46 in the modification of Figures 1–4 may be about 5,000 revolutions per minute, for a wheel diameter of about 1⅛″. The speed of rotation of the wheels in the form shown in Figures 6–8 may be quite variable depending upon the size or form of the wire, and the insulation to be stripped. In practice, the conical surfaces 174 and 176 will be in sufficient contact to afford a friction drive from one wheel to the other, the fibrous material yielding to permit passage of wire therebetween during stripping. Large wire may be projected between the cylindrical portions of the wheels shown in Figure 6, while the conical portions are in frictional driving relation. The wire can be moved sufficiently toward the conical portions to provide the stripping action, stripping being effected by the cylindrical surfaces, which because of the angular relation, produce the same effect upon the wire, as though the wire were of smaller diameter and projected between the conical portions.

The conical form of wheel, such as shown in Figure 6, permits the use of small diameters at the tip end, in fact smaller diameters than could be satisfactorily provided with bearings, if the wheels were cylindrical and the shafts parallel.

It will be appreciated in the form shown in Figures 1–4, the stripping wheels, if formed of glass fibers, all extending parallel with the axis afford an opportunity to provide absolute control over the fiber density at the conical stripping surfaces.

Although a single embodiment of the invention has been illustrated and described in detail with some variations referred to, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A wire stripping apparatus, comprising a base, oppositely inclined shaft bearings mounted on said base, shafts mounted in said bearings the axes of which intersect one another, and fiber glass wheels fixed to the adjacent ends of said shafts, said wheels having facing conical abrading faces adapted to receive therebetween wire ends to be stripped extending in a direction generally perpendicular to the common plane of said axes and comprising predominantly fiber ends adapted to contact one another along a line lying in the common plane of said axes, and bisecting the angle therebetween, the fiber glass of said wheels being the sole abrasive element.

2. A wire stripping apparatus, comprising a base, oppositely inclined shaft bearings mounted on said base, shafts mounted in said bearings the axes of which intersect one another, fiber glass wheels fixed to the adjacent ends of said shafts, said wheels having facing conical abrading faces adapted to receive therebetween wire ends to be stripped extending in a direction generally perpendicular to the common plane of said axes and comprising predominantly fiber ends adapted to contact one another along a line lying in the common plane of said axes, and bisecting the angle therebetween, the fiber glass of said wheels being the sole abrasive element, and means for driving said shafts at the same speeds, with the peripheries of said wheels rotating in substantially the same direction.

3. A wire stripping apparatus, comprising a base, oppositely inclined shaft bearings mounted on said base, shafts mounted in said bearings the axes of which intersect one another, said shafts being threaded on their adjacent ends, a fiber glass wheel threaded on the adjacent end of each of said shafts and having means for fixing each wheel against rotation with respect to the shaft on which it is threaded, said wheels having facing conical abrading faces adapted to receive therebetween wire ends to be stripped extending in a direction generally perpendicular to the common plane of said axes and comprising predominantly fiber ends adapted to contact one another along a line lying in the common plane of said axes, and bisecting the angle therebetween, the fiber glass of said wheels being the sole abrasive element, and means for driving said shafts at the same speeds, with the peripheries of said wheels rotating in substantially the same direction.

4. A wire stripping apparatus, comprising a base, oppositely inclined shaft bearings mounted on said base, shafts mounted in said bearings the axes of which intersect one another, said shafts being oppositely threaded on their adjacent ends, fiber glass wheels having mounting collars threaded on the adjacent ends of said shafts, said wheels having facing conical abrading faces adapted to receive therebetween wire ends to be stripped extending in a direction generally perpendicular to the common plane of said axes and comprising predominantly fiber ends adapted to contact one another along a line lying in the common plane of said axes, and bisecting the angle therebetween, the fiber glass of said wheels being the sole abrasive element, and means for driving said shafts at the same speeds, with the peripheries of said wheels rotating in substantially the same direction, and a direction tending to thread the wheels away from one another upon resistance to rotation of the wheels.

5. A wire stripping apparatus, comprising a base, oppositely inclined shaft bearings mounted on said base, shafts mounted in said bearings the axes of which intersect one another to form an angle between such shafts, fiber glass wheels fixed to the adjacent ends of said shafts, said wheels having facing conical abrading faces adapted to receive therebetween wire ends to be stripped extending in a direction generally perpendicular to the common plane of said axes and comprising predominantly fiber ends each having apex angles corresponding to the angle between said shafts, the fiber glass of said wheels being the sole abrasive element, means for driving said shafts at the same speeds, with the peripheries of said wheels rotating in substantially the same direction, and means for positioning said wheels on their respective shafts with their conical faces symmetrically disposed about the intersection of the axes of said shafts.

6. A wire stripping apparatus, comprising a base, oppositely inclined shaft bearings mounted on said base, shafts mounted in said bearings the axes of which intersect one another to form an angle between said shafts, fiber glass wheels fixed to the adjacent ends of said shafts, said wheels having facing conical abrading faces adapted to receive therebetween wire ends to be stripped extending in a direction generally perpendicular to the common plane of said axes and comprising predominantly fiber ends each having apex angles corresponding to the angle between said shafts, the fiber glass of said wheels being the sole abrasive element means for driving said shafts at the same speeds, with the peripheries of said wheels rotating in substantially the same direction, means for positioning said wheels on their respective shafts with their conical faces symmetrically disposed about the intersection of the axes of said shafts, and means for changing the spacing between said shaft bearings without affecting the symmetry between said faces, to accommodate wire of different diameter between the adjacent portions of said conical abrading faces.

7. A wire stripping apparatus, comprising a base, oppositely inclined shaft bearings mounted on said base, shafts mounted in said bearings the axes of which intersect one another to form an angle between said shafts, fiber glass wheels fixed to the adjacent ends of said shafts, said wheels having facing conical abrading faces having a multiplicity of glass fiber ends forming the sole abrasive element, each face having apex angles corresponding to the angle between said shafts, said faces being sufficiently yielding to permit endwise insertion therebetween in a direction substantially perpendicular to a plane common to the shaft axes, of an end of wire to be stripped, means for driving said shafts at the same speeds, with the peripheries of said wheels rotating in substantially the same direction, and means for positioning said conical faces in substantial contact with each other along a line defining a common element of each conical face.

8. A wire stripping apparatus comprising a base, oppositely inclined shaft bearings mounted on said base, shafts mounted in said bearings, the axes of which intersect one another, fiber glass wheels fixed to the adjacent ends of said shafts, said wheels having facing conical abrading faces adapted to receive therebetween wire ends to be stripped extending in a direction generally perpendicular to the common plane of said axes and comprising predominantly fiber ends, each having apex angles corresponding to the angle between said shafts, the fiber glass of said wheels being the sole abrasive element and means for driving said shafts at the same speed and in the same direction.

9. A wire stripping apparatus comprising a base, oppositely inclined shaft bearings mounted on said base, shafts mounted in said bearings, the axes of which intersect one another, fiber glass wheels fixed to the adjacent ends of said shafts, said wheels having facing conical abrading faces adapted to receive therebetween wire ends to be stripped extending in a direction generally perpendicular to the common plane of said axes and comprising predominantly fiber ends, each having apex angles corresponding to the angle between said shafts, the fiber glass of said wheels being the sole abrasive element means for driving said shafts at the same speed and in the same direction, a blower associated with said base having an inlet duct leading from the region adjacent the conical faces, and a discharge duct having a collection chamber and an exhaust filter disposed in a wall thereof.

10. A wire stripping apparatus comprising a base having divided parts, oppositely inclined shaft bearings mounted on the divided parts of said base, shafts mounted in said bearings, the axes of which intersect one another, fiber glass wheels fixed to the adjacent ends of said shafts, said wheels having facing conical abrading faces adapted to receive therebetween wire ends to be stripped extending in a direction generally perpendicular to the common plane of said axes and comprising predominantly fiber ends, each having apex angles corresponding to the angle between said shafts, the fiber glass of said wheels being the sole abrasive element means for varying the spacing between said parts, and means for driving said shafts at the same speeds and in the same direction.

11. A wire stripping apparatus comprising a base, spaced bearing supports having oppositely inclined shaft bearings mounted on said base, each comprising spaced ball bearings having inner and outer races, shafts mounted in the inner races of said bearings, the axes of which intersect one another, fiber glass wheels fixed to the adjacent ends of said shafts, said wheels having facing conical abrading faces, each having apex angles corresponding to the angle between said shafts, said faces being sufficiently yielding to permit endwise insertion therebetween in a direction substantially perpendicular to a plane common to the shaft axes, of an end of wire to be stripped, means for fixing three of the inner and outer races of the bearings of each shaft on the shaft and support and for maintaining the fourth under direct axial pressure resiliently exerted over the entire annular end face thereof to eliminate radial play in said bearings, and means for driving said shafts.

12. A wire stripping apparatus comprising a base having divided parts, spaced bearing supports having oppositely inclined shaft bearings mounted on the divided parts of said base comprising spaced ball bearings having inner and outer races, shafts mounted in said bearings, the axes of which intersect one another, fiber glass wheels fixed to the adjacent ends of said shafts, said wheels having facing conical abrading faces, each having apex angles corresponding to the angle between said shafts, said faces being sufficiently yielding to permit endwise insertion therebetween in a direction substantially perpendicular to a plane common to the shaft axes, of an end of wire to be stripped, means for fixing three of the inner and outer races of the bearings of each shaft on the shaft and support, and for maintaining the fourth under direct axial pressure resiliently exerted over the entire annular end face thereof to eliminate radial play in said bearings, and means for varying the spacing between the divided parts of said base to vary the spacing between said conical faces.

13. A wire stripping apparatus comprising a base, spaced bearing supports having oppositely inclined shaft bearings mounted on said base, shafts mounted in said bearings, the axes of which are directed downwardly toward and intersect one another forming an angle between said shafts, fiber glass wheels fixed to the adjacent ends of said shafts, said wheels having facing conical abrading faces adapted to receive therebetween wire ends to be stripped extending in a direction generally perpendicular to the common plane of said axes and comprising predominantly fiber ends, each having apex angles corresponding to the angle between said shafts, the fiber glass of said wheels being the sole abrasive element and means for driving said shafts at the same speeds and in the same direction, means associated with said supports forming an enclosure for said abrading faces except around the upper peripheries thereof to provide for insertion of wire extending in the aforesaid direction, and suction means for drawing air downwardly through the region of said faces into said enclosure.

14. A wire stripping apparatus comprising a base, said base having at one end and forward thereof a blower housing, a rotary impeller mounted in said housing, a pair of spaced oppositely inclined shaft bearing supports mounted on said blower housing, shafts journalled in said bearing supports the axes of said shafts extending at an angle to one another and intersecting centrally above said blower housing, conical faced fiber glass abrading wheels mounted on said shafts, with the conical faces disposed adjacent one another, the fiber glass of said wheels and particularly the fiber ends in the faces thereof being the sole abrading element, and being adapted to act on the insulation of wire sections for stripping projecting between the faces in a direction generally perpendicular to the common plane of the axes of said shafts an inlet duct leading to said impeller from a region adjacent said faces, an outlet duct from said blower leading rearwardly, a receptacle disposed at one end of said base, and rearwardly of said blower, and connected to said outlet duct, an exhaust filter for said receptacle, a motor mounted on said base having a drive shaft extending behind said impeller and said bearing supports, and separate belt drives to each of said abrading wheel shafts, and said impeller from said motor shaft.

15. A wire stripping apparatus comprising a pair of shaft bearings, shafts in said bearings on axes intersecting one another and forming an angle ranging from 10 to 170 degrees, abrasive wheels mounted on the converging ends of said shafts, each having a conical face, the apex angle of which is equal to the angle between the shafts, said abrasive wheels being adapted to contact each other along a line bisecting the angle between said shafts and act on the insulation of wire section projecting between the faces in a direction generally perpendicular to the common plane of the axes of said shafts, and means for driving said wheels with their adjacent peripheral portions traveling together at the same speed, each of said wheels being composed of a mass of abrasive filaments extending relatively straight through the body of the wheel, and presenting a multiplicity of abrasive filament ends terminating in and forming the conical face.

16. A wire stripping apparatus comprising a pair of shaft bearings, shafts in said bearings on axes intersecting one another and forming an angle ranging from 10 to 170 degrees, abrasive wheels mounted on the converging ends of said shafts, each having a conical face adapted to contact the other along a common element of each, the sum of the apex angles of said conical faces being double the angle between the shafts and act on the insulation of wire section projecting between the faces in a direction generally perpendicular to the common plane of the axes of said shafts, and means for driving said wheels with their adjacent peripheral portions traveling together at the same peripheral speed, each of said wheels being composed of a mass of abrasive filaments extending relatively straight through the body of the wheel, and presenting a multiplicity of abrasive filament ends terminating in and forming the conical face.

17. An abrasive wire stripping wheel adapted to be used in pairs comprising means for mounting said wheel on a drive shaft for rotation about the axis of the wheel, said wheel having a truncated conical stripping face bearing an angle to the axis in the range of 5 to 85 degrees, said wheel being composed of a mass of abrasive filaments extending relatively straight through the body of the wheel, and presenting a multiplicity of abrasive filament ends terminating in and forming the conical face said filaments extending along lines bearing an angle of at least five degrees from a normal to said conical surface, and means for binding the filaments inwardly of their abrasive ends to provide sufficient resilience of the abrasive ends to flex freely and sufficient rigidity to abrade mildly to produce a proper stripping action at the conical surface, whereby the wire to be stripped is partially embedded in the conical surface and is subjected to only sufficient abrasiveness to remove the insulation around the wire without damaging the wire and whereby said filament ends may flex on contact with wire to be stripped to cross over the wire and cross back as the filament ends initially contact and terminate contact with the wire.

References Cited in the file of this patent

UNITED STATES PATENTS

| | | |
|---|---|---|
| 1,111,254 | French et al. | Sept. 22, 1914 |
| 1,267,091 | Leiman | May 21, 1918 |
| 1,290,897 | Bryant | Jan. 14, 1919 |
| 1,828,663 | Jopp | Oct. 20, 1931 |
| 2,080,197 | Brandenburg | May 11, 1937 |
| 2,384,414 | Antrim | Sept. 4, 1945 |
| 2,597,150 | Kilian | May 20, 1952 |
| 2,643,494 | Erickson | June 30, 1953 |
| 2,698,504 | Lotz | Jan. 4, 1955 |
| 2,711,620 | Shelby | June 28, 1955 |
| 2,763,105 | Feeley | Sept. 18, 1956 |